(12) United States Patent
Wang et al.

(10) Patent No.: US 12,526,367 B2
(45) Date of Patent: Jan. 13, 2026

(54) SESSION BORDER CONTROLLER (SBC) SYSTEM

(71) Applicant: YEALINK (XIAMEN) NETWORK TECHNOLOGY CO., LTD., Fujian (CN)

(72) Inventors: Bin Wang, Fujian (CN); Jianbiao Pan, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 439 days.

(21) Appl. No.: 18/205,492

(22) Filed: Jun. 2, 2023

(65) Prior Publication Data

US 2023/0396714 A1  Dec. 7, 2023

(30) Foreign Application Priority Data

Jun. 2, 2022 (CN) .......................... 202210628537.7

(51) Int. Cl.
*H04M 7/00* (2006.01)
(52) U.S. Cl.
CPC ................................ *H04M 7/0066* (2013.01)
(58) Field of Classification Search
CPC ................................................... H04M 7/0066

USPC ......................................................... 370/259
See application file for complete search history.

(56) References Cited

U.S. PATENT DOCUMENTS

| 2011/0145639 | A1* | 6/2011 | Farahmand | H04L 67/1034 |
| | | | | 714/25 |
| 2017/0302554 | A1* | 10/2017 | Chandrasekaran | ........................... |
| | | | | H04L 43/0811 |
| 2021/0036960 | A1* | 2/2021 | Xu | H04L 43/10 |

* cited by examiner

*Primary Examiner* — Christopher M Crutchfield
*Assistant Examiner* — Jean F Voltaire

(57) ABSTRACT

A session border controller (SBC) system includes an SBC signaling and media processing module and an SBC signaling access module. The SBC signaling access module is configured to: receive signaling sent by a terminal and forward the signaling to the SBC signaling and media processing module; and when the terminal is disconnected from a network during a call, re-register and reconnect the terminal, and after the terminal is reconnected, receive an information request from the terminal during the call and forward the information request to the SBC signaling and media processing module. The SBC signaling and media processing module is configured to: process the signaling and media streams from the terminal, and when the terminal is disconnected from the network during the call, learn, based on the information request, a transmission link for communication with the terminal after the terminal is reconnected upon the disconnection from the network.

16 Claims, 3 Drawing Sheets

SESSION BORDER CONTROLLER (SBC) SYSTEM

CROSS-REFERENCE TO RELATED APPLICATIONS

The present application claims the benefit of Chinese Patent Application No. 202210628537.7 filed on Jun. 2, 2022, the contents of which are hereby incorporated by reference.

TECHNICAL FIELD

The present disclosure relates to the technical field of communications, and in particular, to a session border controller (SBC) system.

BACKGROUND

As a telephone system based on an IP network, an Internet Protocol Private Branch Exchange (IP-PBX) generally uses the Session initialization Protocol (SIP). In a common practice, an SBC is introduced into an IP-PBX system to provide compatibility, security, and media penetration, and other capabilities. An IP-PBX terminal is often disconnected from a network, which is normal (especially when an APP of a mobile terminal performs network switching). However, if the IP-PBX terminal is disconnected during a call, user experience is greatly affected. Therefore, after the terminal is disconnected from the network, it is very important to restore a connection to the network, as well as signaling and media during the call.

In an existing reconnection technology upon network disconnection, reconnection of the IP-PBX terminal after the IP-PBX terminal is disconnected from the network is limited by a SIP standard, and is often not easy to implement or is implemented with a poor effect. In some cases, the call is maintained, in other words, the media is still connected, but the signaling is not connected, which affects a PBX service during some calls. In other cases, an INVITE request with Replaces is initiated after the terminal is successfully reconnected and registered, which is equivalent to restarting a new call. If a certain state of the call before the reconnection, such as a recording state, is considered, it cannot be guaranteed that the recording state before the reconnection can still be maintained after the reconnection. Additionally, some unexpected results are caused when IP-PBX terminals on both sides each trigger the INVITE request with Replaces at the same time.

Therefore, at present, there is an urgent need for an SBC system capable of ensuring that the signaling and the media can be restored after the terminal is reconnected upon the disconnection from the network.

SUMMARY

The present disclosure provides an SBC system to resolve a prior-art technical problem that signaling and media cannot be restored after a terminal is reconnected upon disconnection from a network.

To resolve the above technical problem, an embodiment of the present disclosure provides an SBC system, including an SBC signaling and media processing module, and at least one SBC signaling access module, where the SBC signaling access module is configured to: receive signaling sent by a terminal and forward the signaling to the SBC signaling and media processing module; and when the terminal is disconnected from a network during a call, re-register and reconnect the terminal, and after the terminal is reconnected, receive an information request from the terminal during the call and forward the information request to the SBC signaling and media processing module, where the signaling includes the information request; and the SBC signaling and media processing module is configured to: process the signaling and media streams from the terminal, and when the terminal is disconnected from the network during the call, learn, based on the information request, a transmission link for communication with the terminal after the terminal is reconnected upon the disconnection from the network, such that the signaling and media streams of the terminal after the terminal is reconnected upon the disconnection from the network are transmitted through the transmission link.

It can be understood that compared with the prior art, the embodiments of the present disclosure can divide the SBC system into the SBC signaling access module and the SBC signaling and media processing module, to enable the terminal to perform re-registration with and reconnection to the SBC signaling access module when the terminal is reconnected upon the disconnection from the network, and enable, based on the information request sent by the terminal, the SBC signaling and media processing module to learn the transmission link to the terminal. This ensures that after the disconnection from the network, the signaling and media streams can be restored to the SBC signaling and media processing module of the call before the disconnection from the network, which avoids that signaling and media cannot be restored due to a new call caused by reconnection upon network disconnection in the prior art. The present disclosure improves user experience during a call.

As a preferred solution, when there are a plurality of SBC signaling access modules, a process of re-registering and reconnecting the terminal when the terminal is disconnected from the network during the call is specifically as follows:

when the terminal is disconnected from the network during the call, sequentially re-registering and reconnecting, by each of the plurality of SBC signaling access modules, the terminal based on a registration request sent by the terminal, until the terminal is successfully registered and connected to one of the plurality of SBC signaling access modules.

It can be understood that the plurality of SBC signaling access modules can still ensure that the signaling of the terminal can be connected and transmitted to an SBC after the reconnection upon the disconnection from the network, improving a fault tolerance rate of a connection failure. In addition, the terminal switches the SBC signaling access module after being reconnected upon the disconnection from the network, which can ensure that the terminal can also switch to another IP-PBX system server, thereby achieving high scalability.

As a preferred solution, the information request of the terminal during the call includes a source IP address and a port of the terminal.

It can be understood that the source IP address and the port of the terminal in the information request sent by the terminal can enable the SBC signaling and media processing module in the SBC system to generate a transmission link from the terminal to the SBC signaling and media processing module via the SBC signaling access module. In this way, the SBC signaling and media processing module can reversely transmit signaling back to the terminal based on the transmission link.

As a preferred solution, a process of receiving the information request from the terminal during the call and forwarding the information request to the SBC signaling and media processing module is specifically as follows:

receiving the information request of the terminal during the call, adding an identifier (ID) of the SBC signaling access module to a custom header field of the information request, and forwarding the information request containing the added ID to the SBC signaling and media processing module.

It can be understood that the ID of the SBC signaling access module is added to the custom header field of the information request sent by the terminal during the call. In this way, when sending a request to the terminal, the SBC signaling and media processing module can send, based on the ID of the SBC signaling access module, the request to a corresponding SBC signaling access module connected to the terminal, such that the request and other information can be sent to the terminal.

As a preferred solution, a process of learning, based on the information request, the transmission link for communication with the terminal after the terminal is reconnected upon the disconnection from the network is specifically as follows:

generating, based on the source IP address and the port of the terminal in the received information request, a transmission link between the terminal and the SBC signaling access module after the terminal is reconnected upon the disconnection from the network; generating a transmission link between the SBC signaling access module and the SBC signaling and media processing module based on the ID of the SBC signaling access module in the received information request to obtain a signaling address of the terminal; and generating, based on the signaling address of the terminal, a transmission link for signaling interworking among the terminal, the SBC signaling access module, and the SBC signaling and media processing module after the terminal is reconnected upon the disconnection from the network.

It can be understood that based on the source IP address and the port of the terminal in the information request and the ID of the SBC signaling access module, the SBC signaling and media processing module can obtain the signaling address of the signaling sent by the terminal, to further generate the transmission link from the terminal to the SBC signaling and media processing module via the SBC signaling access module. This can achieve signaling interworking between the SBC system and the terminal.

As a preferred solution, after the transmission link for signaling interworking among the terminal, the SBC signaling access module, and the SBC signaling and media processing module after the terminal is reconnected upon the disconnection from the network is generated, following steps are further included:

obtaining a media stream address of the terminal based on a symmetric Real-time Transport Protocol (RTP) mechanism of the SBC signaling and media processing module and the transmission link for signaling interworking; and learning and generating a transmission link for media stream interworking among the terminal, the SBC signaling access module, and the SBC signaling and media processing module based on the media stream address of the terminal.

It can be understood that the symmetric RTP mechanism can ensure that the media stream address of the terminal can be obtained when the terminal sends the media stream to the SBC signaling and media processing module after being reconnected, so as to generate the transmission link from the terminal to the SBC signaling and media processing module via the SBC signaling access module. This can achieve media stream interworking between the SBC system and the terminal.

As a preferred solution, the signaling further includes a re-negotiation request.

It can be understood that the signaling is a control signal used between modules, and any request sent by the terminal is signaling. Different signaling, for example, an update request and a re-invitation request included in the re-negotiation request, can trigger the SBC system to perform different operations, thereby ensuring smooth and accurate communication between the terminal and the SBC.

As a preferred solution, when the update request or the re-invitation request of the terminal is received and forwarded to the SBC signaling and media processing module, the SBC signaling and media processing module is configured to learn and generate a transmission link for signaling and media stream interworking with the terminal, where Session Description Protocol (SDP) text information of the update request or the re-invitation request includes the media stream address of the terminal.

It can be understood that when the signaling sent by the terminal to the SBC signaling and media processing module is the update request or the re-invitation request, the SBC signaling and media processing module does not need to rely on the symmetric RTP mechanism, but can directly carry the media stream address of the terminal in the SDP text information of the update request or the re-invitation request, such that the SBC signaling and media processing module directly generates the transmission link for signaling and media stream interworking with the terminal. This improves efficiency of the SBC signaling and media processing module in learning and generating the transmission link, and also ensures stable and accurate communication between the terminal and the SBC system.

As a preferred solution, the SBC signaling access module supports stateless access.

It can be understood that the SBC signaling access module supporting the stateless access can ensure that the SBC signaling access module only forwards the received signaling or other messages and does not store any communication and signaling media processing information. In this way, when the terminal can perform re-registration and is efficiently connected to any SBC signaling access module after being disconnected from the network, the SBC signaling access module can still accurately and efficiently serve as a proxy of the terminal to send the signaling and media streams during the call to the SBC signaling and media processing module of the call before the terminal is disconnected from the network.

DETAILED DESCRIPTION

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

An IP-PBX is an IP-based telephone system that can fully integrate voice communication into a dedicated data network, to establish a unified voice and data network by connecting geographically distributed terminals.

As an IP telephony protocol proposed by the Internet Engineering Task Force (IETF), the SIP is a text-based application layer control protocol for creating, modifying, and releasing a session with one or more participants. As an IP voice session control protocol originating from the Internet, the SIP is flexible, easy to implement, and easy to expand.

An SBC is a device or software deployed at a network boundary to control a SIP session. In the present disclosure, the SBC serves as an access layer for a terminal in an IP-PBX system to provide compatibility, media penetration, security, and other capabilities.

Embodiment 1

Figure 1:
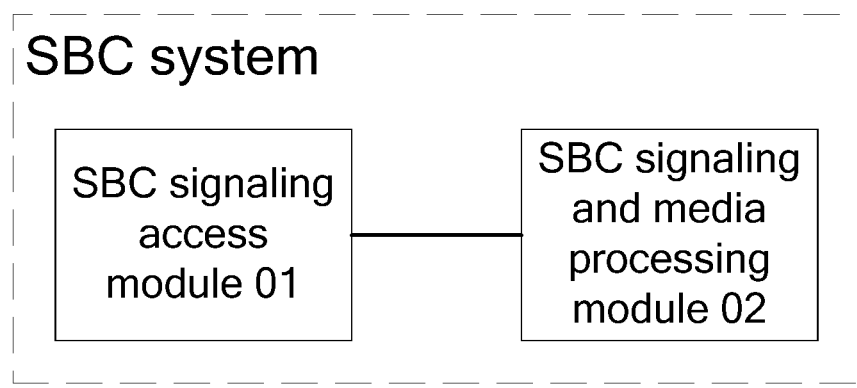
FIG. 1 is a structural diagram of an SBC system according to an embodiment of the present disclosure.

Referring to FIG. 1, an SBC system according to an embodiment of the present disclosure includes: an SBC signaling and media processing module 02, and at least one SBC signaling access module 01.

The SBC signaling access module 01 is configured to: receive signaling sent by a terminal 03 and forward the signaling to the SBC signaling and media processing module; and when the terminal 03 is disconnected from a network during a call, re-register and reconnect the terminal 03, and after the terminal 03 is reconnected, receive an information request from the terminal 03 during the call and forward the information request to the SBC signaling and media processing module 02. The signaling includes the information request.

The SBC signaling and media processing module 02 is configured to: process the signaling and media streams from the terminal 03, and when the terminal 03 is disconnected from the network during the call, learn, based on the information request, a transmission link for communication with the terminal 03 after the terminal 03 is reconnected upon the disconnection from the network, such that the signaling and media streams of the terminal 03 after the terminal 03 is reconnected upon the disconnection from the network are transmitted through the transmission link.

As a preferred solution of this embodiment, the SBC signaling access module 01 supports stateless access.

It can be understood that the SBC signaling access module 01 supporting the stateless access can ensure that the SBC signaling access module 01 only forwards the received signaling or other messages and does not store any communication and signaling media processing information. In this way, when the terminal can perform re-registration and is efficiently connected to any SBC signaling access module after being disconnected from the network, the SBC signaling access module 01 can still accurately and efficiently serve as a proxy of the terminal 03 to send the signaling and media streams during the call to the SBC signaling and media processing module 02 of the call before the terminal 03 is disconnected from the network.

It should be noted that SIP signaling of the terminal 03 is directly connected to the SBC signaling access module 01. The SBC signaling access module 01 implements a stateless SIP proxy function to forward SIP messages of the terminal and the SBC signaling and media processing module 02. Media of the terminal 03 is connected to the SBC signaling and media processing module 02. Statuses of the SIP session, the media, and other information are maintained by the SBC signaling and media processing module 02.

Figure 2:
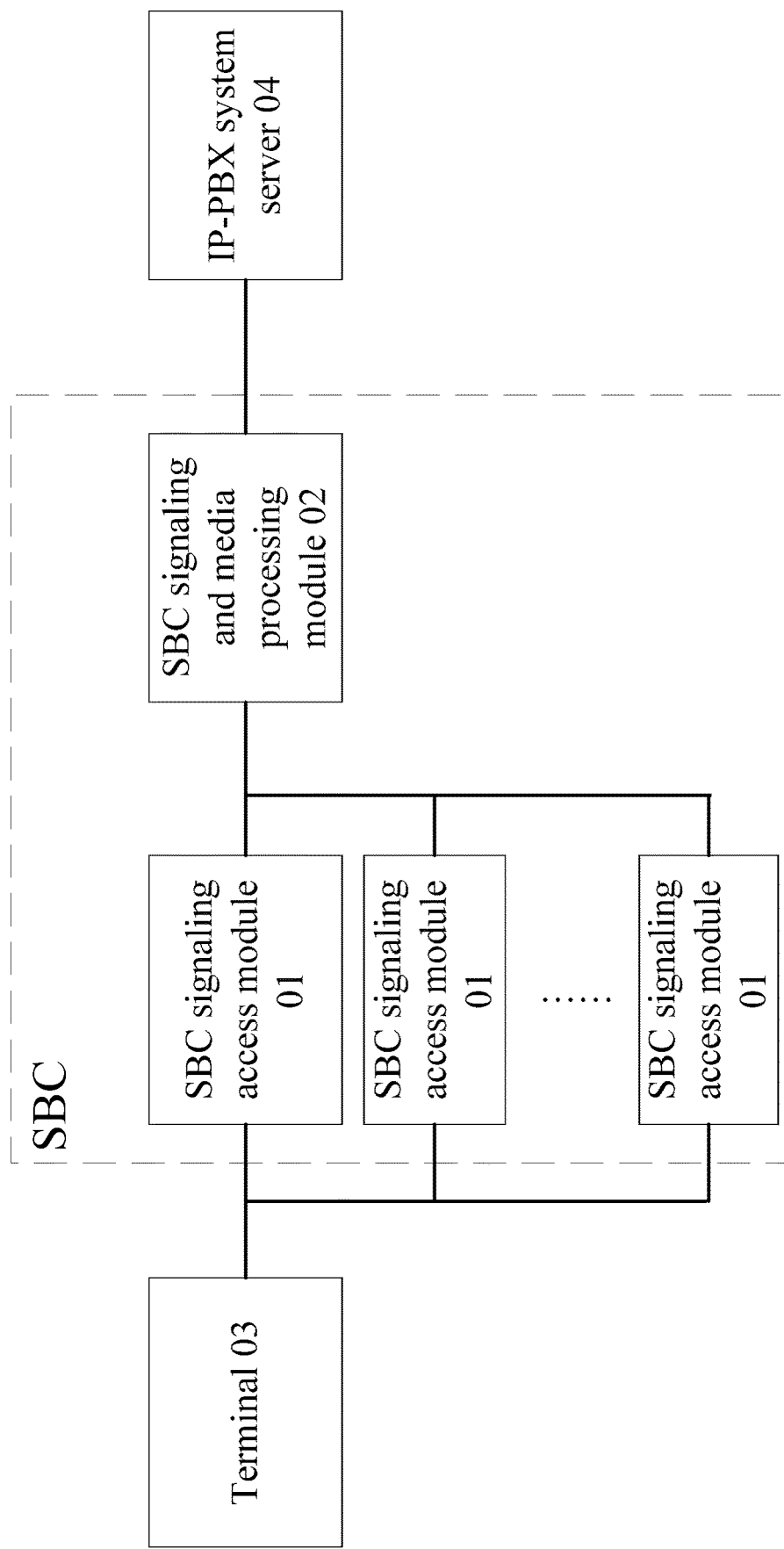
FIG. 2 is a structural diagram of a connection between an SBC system and an external terminal according to an embodiment of the present disclosure.

As a preferred solution of this embodiment, referring to FIG. 2, when there are a plurality of SBC signaling access modules 01, a process of re-registering and reconnecting the terminal 03 when the terminal 03 is disconnected from the network during the call is specifically as follows:

when the terminal 03 is disconnected from the network during the call, sequentially re-registering and reconnecting, by each of the plurality of SBC signaling access modules 01, the terminal 03 based on a registration request sent by the terminal 03, until the terminal 03 is successfully registered and connected to one of the plurality of SBC signaling access modules 01.

It can be understood that the plurality of SBC signaling access modules 01 can still ensure that the signaling of the terminal 03 can be connected and transmitted to an SBC after the reconnection upon the disconnection from the network, improving a fault tolerance rate of a connection failure. In addition, the terminal 03 switches the SBC signaling access module 01 after being reconnected upon the disconnection from the network, which can ensure that the terminal 03 can also switch to another IP-PBX system server 04, thereby achieving high scalability.

In this embodiment, it should be noted that in the SBC system, one SBC signaling access module 01 can implement functions of re-registering and reconnecting the terminal 03, receiving the signaling and media streams sent by the terminal 03, and sending the signaling and media streams to the SBC signaling and media processing module. However, the plurality of SBC signaling access modules 01 can ensure that the terminal 03 can continuously attempt to perform registration and reconnection after being disconnected from the network, thereby improving a fault tolerance rate of a reconnection failure of the terminal 03.

As a preferred solution of this embodiment, the information request of the terminal 03 during the call includes a source IP address and a port of the terminal.

As a preferred solution of this embodiment, a process of receiving the information request from the terminal 03 during the call and forwarding the information request to the SBC signaling and media processing module 02 is specifically as follows:

receiving the information request from the terminal 03 during the call, adding an ID of the SBC signaling access module 01 to a custom header field of the information request, and forwarding the information request containing the added ID to the SBC signaling and media processing module 02.

It can be understood that the source IP address and the port of the terminal in the information request sent by the terminal 03 can enable the SBC signaling and media processing module 02 in the SBC system to generate a transmission link from the terminal 03 to the SBC signaling and media processing module 02 via the SBC signaling access module 01. In this way, the SBC signaling and media processing module 02 can reversely transmit signaling back to the terminal 03 based on the transmission link.

Further, the ID of the SBC signaling access module 01 is added to the custom header field of the information request sent by the terminal 03 during the call. In this way, when sending a request to the terminal 03, the SBC signaling and media processing module 02 can send, based on the ID of the SBC signaling access module 01, the request to a corresponding SBC signaling access module 01 connected to the terminal 03, such that the request and other information can be sent to the terminal 03.

As a preferred solution, a process of learning, based on the information request, the transmission link for communication with the terminal 03 after the terminal 03 is reconnected upon the disconnection from the network is specifically as follows:

generating, based on the source IP address and the port of the terminal in the received information request, a transmission link between the terminal 03 and the SBC signaling access module 01 after the terminal 03 is reconnected upon the disconnection from the network; generating a transmission link between the SBC signaling access module 01 and the SBC signaling and media processing module 02 based on the ID of the SBC signaling access module 01 in the received information request to obtain a signaling address of the terminal 03; and generating, based on the signaling address of the terminal 03, a transmission link for signaling interworking among the terminal 03, the SBC signaling access module 01, and the SBC signaling and media processing module 02 after the terminal 03 is reconnected upon the disconnection from the network.

It can be understood that based on the source IP address and the port of the terminal in the information request and the ID of the SBC signaling access module 01, the SBC signaling and media processing module 02 can obtain the signaling address of the signaling sent by the terminal 03, to further generate the transmission link from the terminal 03 to the SBC signaling and media processing module 02 via the SBC signaling access module 01. This can achieve signaling interworking between the SBC system and the terminal 03.

As a preferred solution, after the transmission link for signaling interworking among the terminal 03, the SBC signaling access module 01, and the SBC signaling and media processing module 02 after the terminal 03 is reconnected upon the disconnection from the network is generated, following steps are further included:

obtaining a media stream address of the terminal 03 based on a symmetric RTP mechanism of the SBC signaling and media processing module 02 and the transmission link for signaling interworking; and learning and generating a transmission link for media stream interworking among the terminal 03, the SBC signaling access module 01, and the SBC signaling and media processing module 02 based on the media stream address of the terminal.

It can be understood that the symmetric RTP mechanism can ensure that the media stream address of the terminal 03 can be obtained when the terminal 03 sends the media stream to the SBC signaling and media processing module 02 after being reconnected, so as to learn and generate the transmission link from the terminal 03 to the SBC signaling and media processing module 02 via the SBC signaling access module 01. This can achieve signaling interworking between the SBC system and the terminal 03. The symmetric RTP is a universal mechanism and a standard behavior. After receiving an RTP media stream, the terminal 03 records a source IP address and a port. Next time, the terminal 03 sends an RTP media stream to the recorded source IP address and port of the received RTP media stream according to a same path. The same applies to the SBC signaling and media processing module 02.

Further, the symmetric RTP mechanism is designed to achieve network penetration. For example, the terminal 03 is on an internal network, and an IP-PBX system server on which the SBC signaling and media processing module 02 is located is on an external network. The terminal 03 can directly communicate with the server, but the server cannot directly communicate with the terminal 03. Therefore, the symmetric RTP mechanism can only be used to communicate with the terminal 03 according to the same path.

As a preferred solution of this embodiment, the signaling further includes a re-negotiation request.

Specifically, the re-negotiation request includes but is not limited to an update request and a re-invitation request.

It can be understood that the signaling is a control signal used between modules, and any request sent by the terminal 03 is signaling. Different signaling, for example, the update request UPDATE and the re-invitation request reINVITE included in the re-negotiation request, can trigger the SBC system to perform different operations, thereby ensuring smooth and accurate communication between the terminal 03 and the SBC.

As a preferred solution of this embodiment, when the re-negotiation request of the terminal 03 is received and forwarded to the SBC signaling and media processing module 02, the SBC signaling and media processing module 02 learns and generates a transmission link for signaling and media stream interworking with the terminal. SDP text information of the re-negotiation request includes the media stream address of the terminal 03.

It should be noted that after the terminal 03 is reconnected upon the disconnection from the network, in addition to initiating the simple information request, the terminal 03 can also initiate the re-negotiation request including the update request UPDATE or the re-invitation request reINVITE, in other words, directly carries a latest signaling address and media address of the terminal 03 in an SDP text and transmits the SDP text to the SBC, without relying on the symmetric RTP mechanism. The SDP provides multimedia session descriptions for session notification, session invitation, and other forms of multimedia session initialization. The SDP text information includes but is not limited to a session name and intention, session duration, media constituting the session, and information about receiving the media (such as the media stream address).

It can be understood that when the signaling sent by the terminal 03 to the SBC signaling and media processing module 02 is the re-negotiation request, the SBC signaling and media processing module 02 does not need to rely on the symmetric RTP mechanism, but can directly carry the media stream address of the terminal 03 in the SDP text information of the re-negotiation request, such that the SBC signaling and media processing module 02 directly generates the transmission link for signaling and media stream interworking. This improves efficiency of the SBC signaling and media processing module 02 in learning and generating the transmission link, and also ensures stable and accurate communication between the terminal 03 and the SBC system.

In an implementation of this embodiment, the at least one SBC signaling access module 01 and the SBC signaling and media processing module 02 each may be one or more processors, controllers or chips that each have a communication interface and can realize a communication protocol, and may further include a memory, a related interface and system transmission bus, and the like if necessary. The processor, controller or chip executes program-related code to implement a corresponding function. In an alternative solution, the SBC signaling access module 01 and the SBC signaling and media processing module 02 share an integrated chip or share devices such as a processor, a controller, and a memory. The shared processor, controller or chip executes program-related code to implement a corresponding function.

Figure 3:
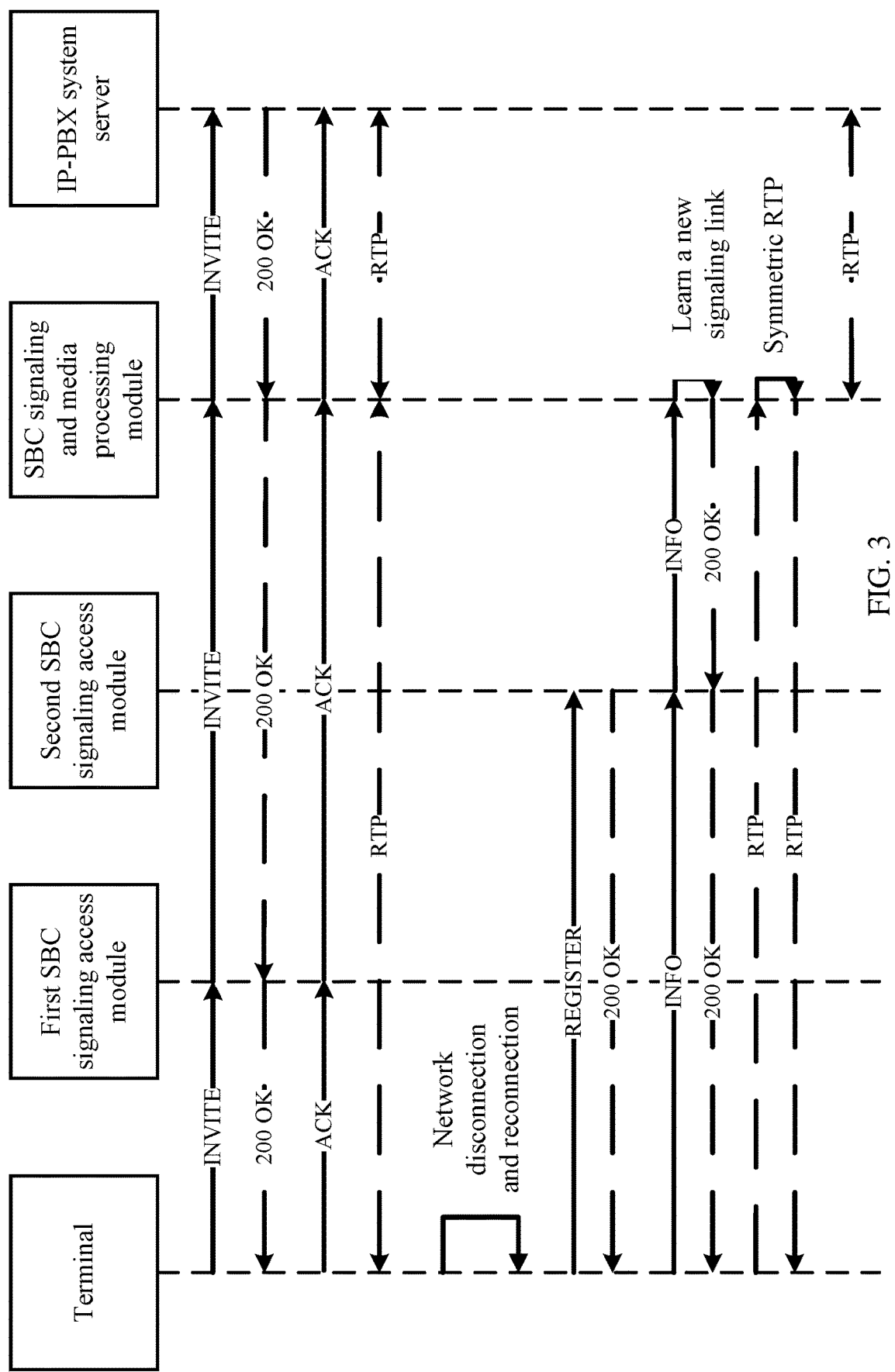
FIG. 3 is a sequence chart of a process in which a terminal is disconnected from a network and reconnected according to an embodiment of the present disclosure.

FIG. 3 is a sequence chart of a process in which the terminal is disconnected from the network and reconnected in this embodiment. Before being disconnected from the network and reconnected, the terminal normally communicates with the IP-PBX system server through a first SBC signaling access module 01 and the SBC signaling and media processing module 02.

When the terminal is disconnected from the network and reconnected, if the first SBC signaling access module is unable to register and connect the terminal, the terminal may switch to and re-register with a second SBC signaling access module. Specifically, the terminal sends a REGISTER request to the second SBC signaling access module for registration.

After being reconnected upon the disconnection from the network, the terminal initiates an INFO request (information request) during a call to the newly accessed second SBC signaling access module. As the SBC signaling access module is a stateless proxy, the SBC signaling access module can still send the signaling of the terminal during the call to the original signaling and media processing module. The original signaling and media processing module is the SBC signaling and media processing module with which the terminal communicates normally before being disconnected from the network and reconnected. That is, a state of the terminal before the terminal is disconnected from the network is saved in the SBC signaling and media processing module. In this way, after the terminal is reconnected upon the disconnection from the network, a call state and the signaling and media streams can be restored.

After the INFO request is forwarded to the original SBC signaling and media processing module, the SBC signaling and media processing module can perform reverse learning and know how a request in a subsequent call is finally sent back to the terminal through a latest second SBC signaling access module. Based on one INFO request, signaling sent to the SBC signaling and media processing module and signaling sent to the terminal can be interworked again. However, due to the symmetric RTP mechanism of the SBC signaling and media processing module, after the terminal is reconnected, the media stream is sent to the SBC signaling and media processing module. The SBC signaling and media processing module can also learn the latest media stream address of the terminal, and the media stream can also be interworked.

A key point of this embodiment of the present disclosure is to implement the SBC system based on the SIP standard to provide terminal access. The SBC system separates the SBC signaling access module and the SBC signaling and media processing module. When being reconnected upon the disconnection from the network, the terminal can only switch to a different SBC signaling access module at most.

Then, the terminal sends the information request to the SBC signaling and media processing module to learn and generate a latest transmission link to the terminal. In addition, the symmetric RTP mechanism of the SBC signaling and media processing module makes it possible to achieve signal and media interworking between the terminal and the SBC system, thereby restoring the signaling and the media.

This embodiment of the present disclosure has following effects:

Compared with the prior art, this embodiment of the present disclosure can divide the SBC system into the SBC signaling access module and the SBC signaling and media processing module, to enable the terminal to perform re-registration with and reconnection to the SBC signaling access module when the terminal is reconnected upon the disconnection from the network, and enable, based on the information request sent by the terminal, the SBC signaling and media processing module to learn the transmission link to the terminal. This ensures that after the disconnection from the network, the signaling and media streams can be restored to the SBC signaling and media processing module of the call before the disconnection from the network, which avoids that signaling and media cannot be restored due to a new call caused by reconnection upon network disconnection in the prior art. The present disclosure improves user experience during a call.

The objectives, technical solutions, and beneficial effects of the present disclosure are further described in detail through the above specific embodiments. It should be understood that the above are merely some specific embodiments of the present disclosure, but are not intended to limit the protection scope of the present disclosure. It should be particularly noted that, any modifications, equivalent substitutions, improvements, and the like made by those skilled in the art within the spirit and principle of the present disclosure should be included within the protection scope of the present disclosure.

The invention claimed is:

1. A session border controller (SBC) system, comprising an SBC signaling and media processing module, and at least one SBC signaling access module, wherein
   the SBC signaling access module is configured to: receive signaling sent by a terminal and forward the signaling to the SBC signaling and media processing module; and when the terminal is disconnected from a network during a call, re-register and reconnect the terminal, and after the terminal is reconnected, receive an information request from the terminal during the call and forward the information request to the SBC signaling and media processing module, wherein the signaling comprises the information request; and
   the SBC signaling and media processing module is configured to: process the signaling and media streams from the terminal, and when the terminal is disconnected from the network during the call, learn, based on the information request, a transmission link for communication with the terminal after the terminal is reconnected upon the disconnection from the network, wherein the signaling and media streams of the terminal after the terminal is reconnected upon the disconnection from the network are transmitted through the transmission link.

2. The SBC system according to claim 1, wherein when there are a plurality of SBC signaling access modules, a process of re-registering and reconnecting the terminal when the terminal is disconnected from the network during the call is specifically as follows:

when the terminal is disconnected from the network during the call, sequentially re-registering and reconnecting, by each of the plurality of SBC signaling access modules, the terminal based on a registration request sent by the terminal, until the terminal is successfully registered and connected to one of the plurality of SBC signaling access modules.

3. The SBC system according to claim 1, wherein the information request of the terminal during the call comprises a source Internet Protocol (IP) address and a port of the terminal.

4. The SBC system according to claim 3, wherein a process of receiving the information request from the terminal during the call and forwarding the information request to the SBC signaling and media processing module is specifically as follows:
receiving the information request of the terminal during the call, adding an identifier (ID) of the SBC signaling access module to a custom header field of the information request, and forwarding the information request containing the added ID to the SBC signaling and media processing module.

5. The SBC system according to claim 4, wherein a process of learning, based on the information request, the transmission link for communication with the terminal after the terminal is reconnected upon the disconnection from the network is specifically as follows:
generating, based on the source IP address and the port of the terminal in the received information request, a transmission link between the terminal and the SBC signaling access module after the terminal is reconnected upon the disconnection from the network;
generating a transmission link between the SBC signaling access module and the SBC signaling and media processing module based on the ID of the SBC signaling access module in the received information request to obtain a signaling address of the terminal; and
generating, based on the signaling address of the terminal, a transmission link for signaling interworking among the terminal, the SBC signaling access module, and the SBC signaling and media processing module after the terminal is reconnected upon the disconnection from the network.

6. The SBC system according to claim 5, wherein after the transmission link for signaling interworking among the terminal, the SBC signaling access module, and the SBC signaling and media processing module after the terminal is reconnected upon the disconnection from the network is generated, following steps are further comprised:
obtaining a media stream address of the terminal based on a symmetric Real-time Transport Protocol (RTP) mechanism of the SBC signaling and media processing module and the transmission link for signaling interworking; and
learning and generating a transmission link for media stream interworking among the terminal, the SBC signaling access module, and the SBC signaling and media processing module based on the media stream address of the terminal.

7. The SBC system according to claim 1, wherein the signaling further comprises a re-negotiation request.

8. The SBC system according to claim 7, wherein when an update request or a re-invitation request of the terminal is received and forwarded to the SBC signaling and media processing module, the SBC signaling and media processing module is configured to learn and generate a transmission link for signaling and media stream interworking with the terminal, wherein Session Description Protocol (SDP) text information of the update request or the re-invitation request comprises the media stream address of the terminal.

9. The SBC system according to claim 1, wherein the SBC signaling access module supports stateless access.

10. The SBC system according to claim 2, wherein the SBC signaling access module supports stateless access.

11. The SBC system according to claim 3, wherein the SBC signaling access module supports stateless access.

12. The SBC system according to claim 4, wherein the SBC signaling access module supports stateless access.

13. The SBC system according to claim 5, wherein the SBC signaling access module supports stateless access.

14. The SBC system according to claim 6, wherein the SBC signaling access module supports stateless access.

15. The SBC system according to claim 7, wherein the SBC signaling access module supports stateless access.

16. The SBC system according to claim 8, wherein the SBC signaling access module supports stateless access.

* * * * *